Dec. 21, 1948.    J. W. GIBLER    2,456,630
MILK TURNING MACHINE
Filed Oct. 10, 1945
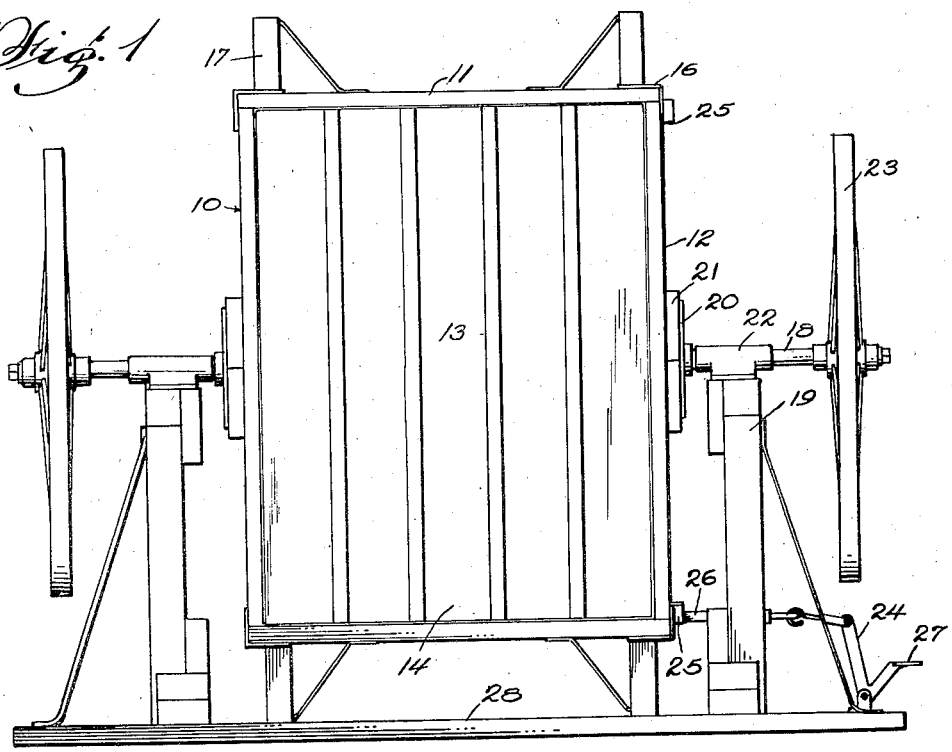
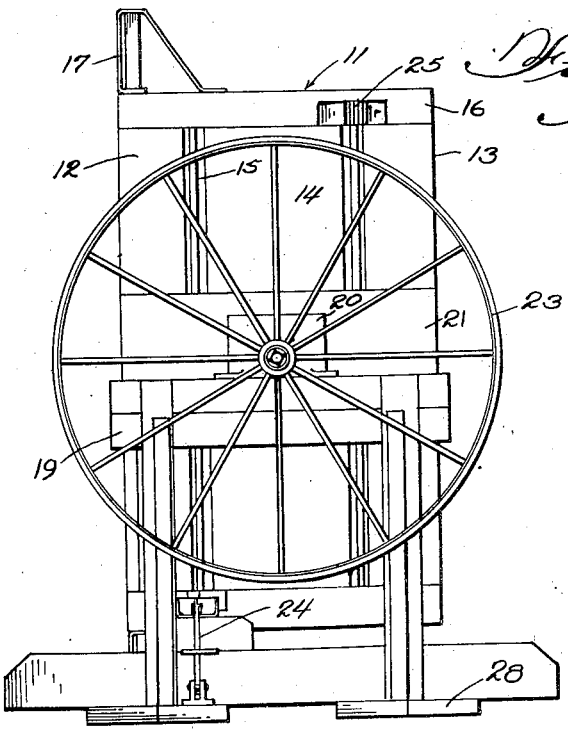
INVENTOR.
John W. Gibler
BY
William F. Desmond
ATTORNEY Patented Dec. 21, 1948

2,456,630

UNITED STATES PATENT OFFICE 2,456,630

MILK TURNING MACHINE

John W. Gibler, United States Army, Mattoon, Ill.

Application October 10, 1945, Serial No. 621,644

5 Claims. (Cl. 259—57)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The invention relates to a milk turning machine.

It is an object of the invention to provide a machine to turn stacks of cartons of canned milk. Canned milk in cartons is stored in warehouses in tiers made up of several pallets each with its original load in place. During storage for long periods it is necessary to agitate the milk in some manner at intervals of 60 days. Unless the milk can be shipped out before the expiration of such period, it is customary to invert the cartons of milk to avoid settling and coagulation of the contents at the lower end of the cans. This work, when done by hand, necessitates removal of the stacks of the milk cartons from the piles by means of a forklift truck and the manual lifting of the cartons to another pallet, the cartons being inverted during shifting. The new pallet is then picked up and restacked by the truck. The turning operation can be speeded up and performed with far less effort by the use of my invention.

It is a further object of the invention to provide a bin-type of milk turner which operates with particular effectiveness when two lift trucks are used to turn the milk, and which avoids all necessity for manual handling of the cartons of milk.

It is a further object of the invention to provide a turning machine which is so balanced that little energy is required to operate it, and which holds the cartons without clamps or other holding devices and which automatically straightens uneven stacks of cartons on the pallet during inversion.

Further objects of the invention will be apparent from a consideration of the following specifications taken in connection with the accompanying drawing in which:

Figure 1 is a front elevational view of the can turning machine and

Figure 2 is an end elevational view of the machine.

In the drawings, 10 represents a bin or holder formed with ends 11, sidewalls 12 and a back 13. The construction may be varied to suit the wishes of the user or the materials at hand, but in the preferred form consists of side, end and bottom walls of boards or planks 14 in somewhat spaced relation secured together by appropriate means such as strap irons and bolts, the bin being reinforced and secured together by tie rods 15, extending from one end 11 to the other, and lying between the spaced planks. The ends 11 of the bin are reinforced at the corners with angle irons 16, and the edges of the planks along the rim of the bin and the corners between the sides and back may be bound with channel or angle irons (not shown), if desired. At the front corners of the bin, as viewed in Figure 1, are located feet or extensions 17 formed of strap iron, which serve as stops for the bin in its swinging movement. A machine designed to turn a pal'et 32" x 40" carrying 25 cartons of canned milk would ordinarily have a bin 55" high, 43" wide, and 32" deep.

The bin 10 is mounted on stub axles 18 pivoted on frame work or standards 19. The axles 18 are secured to the bin at a point slightly in advance of the vertical center line of its side members 12. This slight over-balancing, together with the increased weight at the back of the bin caused by the weight of the back wall, makes the earlier swinging movement of the bin much easier than if the bin were mounted at its center of gravity, while the momentum acquired during the earlier swinging can be taken advantage of to complete the turning motion to reverse the bin and its contents. The axles 18 are rigidly secured to the sidewalls of the bin in the center of reinforcing plates 20 which are mounted on the sidewalls of the bin. Reinforcing boards 21 extend across the sides of the bin to strengthen both the bin and the axle mounting. The axles 18 rotate in bearings 22 carried on the tops of standards 19, and are provided with hand wheels 23 for rotating the assembly.

A latch mechanism 24 is provided consisting of a detent or keeper 25 on the opposite ends of one side of the bin and a plunger 26 mounted in the lower part of the frame work 19 on one side of the machine. The plunger 26 is biased to a forward position by any convenient means such as a spring (not shown), and is retracted by means of the foot pedal 27 when it is desired to release the bin for tilting to invert the cartons.

In operation, the bin is tilted so that its open side is vertical facing the tiers of milk cartons to be inverted. At this point, the feet 17 which extend outwardly from the end wall laterally of the plane which is perpendicular to said end wall and which passes through the axis of rotation of said receptacle, come into contact with the base 28 of the frame work 19, thus checking the motion of the machine without undue strain on the detent and plunger; the cartons, which have been stacked with a pallet beneath each group of 25 cartons, are picked up one pallet load at a time by a lift truck and placed within the bin. The operator places another pallet on top of the stack of cartons in the bin, releases the plunger by means of the foot pedal and, as the bin begins to turn of its own accord, applies additional force to hasten the movement and complete the turn without losing the advantage of the earlier easy turning of the bin. When the bin has completed its turn in a 180° arc so that its open side faces in the opposite direction, it is automatically latched by the same plunger engaging the detent at the opposite end of the bin. During the turning movement the stack of cartons is automatically straightened and brought into alignment by contact with the bottom or back of the bin at the lowest point in its swinging movement. The first pallet, now at the top, is removed by the operator and the entire stock is taken out of the bin by another forklift truck if it is to be stacked at the opposite side of the warehouse or by the same truck if only one is being used.

By the use of this machine, a single operator can invert 100 pallets each containing 25 cartons of milk in an hour. Thus it will be seen that a great saving in time and energy can be effected by the use of my milk turning machine when canned milk must be held in warehouses for periods of more than 60 days.

I claim:

1. An inverting device comprising a receptacle adapted to receive a stack of articles, said receptacle having a pair of side walls, a pair of end walls and a back wall, the front of said receptacle being open, means on said side walls for supporting said receptacle in spaced relation from and close to the ground and for swinging said receptacle in an arc of 180°, a base member, and a stop on each of said end walls of said receptacle and extending outwardly therefrom laterally of the plane which is perpendicular to said end walls and which passes through the axis of rotation of said receptacle, to contact said base member upon completion of the swinging movement of said receptacle, whereby said articles may be conjointly inserted into, inverted in, and removed from said receptacle.

2. An inverting device comprising a receptacle adapted to receive a stack of articles, said receptacle having a pair of side walls, a pair of end walls and a back wall, the front of said receptacle being open, means on said side walls for supporting said receptacle in spaced relation from and close to the ground and for swinging said receptacle in an arc of 180°, said supporting means being secured to said side walls in a plane laterally offset from the center of gravity of said receptacle towards said open front so as to overbalance said receptacle in the direction of said back wall, a base member, and a stop on each of said end walls of said receptacle and extending outwardly therefrom laterally of the plane which is perpendicular to said end walls and which passes through the axis of rotation of said receptacle, to contact said base member upon completion of the swinging movement of said receptacle, whereby said plurality of articles may be conjointly inserted into, inverted in, and removed from said receptacle.

3. An inverting device comprising a receptacle adapted to receive a stack of articles, said receptacle having a pair of side walls, a pair of end walls and a back wall, the front of said receptacle being open, means on said side walls for supporting said receptacle in spaced relation from and close to the ground and for swinging said receptacle in an arc of 180°, said means being secured to said side walls in a plane laterally offset from the center of gravity of said receptacle towards said open front so as to overbalance said receptacle in the direction of said back wall, releasable detent means on opposite ends of said receptacle, and release means mounted on said base member in cooperative alternating relation to said detents for selectively arresting and permitting the swinging movement of said receptacle, whereby said articles may be conjointly inserted into, inverted in, and removed from said receptacle, and whereby the inversion of said receptacle is automatically started upon release of said release means.

4. An inverting device comprising a receptacle adapted to receive a stack of articles, said receptacle having a pair of side walls, a pair of end walls and a back wall, the front of said receptacle being open, means on said side walls for supporting said receptacle in spaced relation from and close to the ground and for swinging said receptacle in an arc of 180°, a base member, a stop on each of said end walls of said receptacle and extending outwardly therefrom laterally of the plane which is perpendicular to said end walls and which passes through the axis of rotation of said receptacle, to contact said base member upon the completion of the movement of said receptacle, and releasable detent means on opposite ends of said receptable to arrest the swinging movement of said receptacle, whereby said articles may be conjointly inserted into, inverted in, and removed from said receptacle.

5. An inverting device comprising a receptacle adapted to receive a stack of articles, said receptacle having a pair of side walls, a pair of end walls and a back wall, the front of said receptacle being open, means on said side walls for supporting said receptacle in spaced relation from and close to the ground and for swinging said receptacle in an arc of 180°, said means being secured to said side walls in a plane laterally offset from the center of gravity of said receptacle towards said open front so as to overbalance said receptacle in the direction of said back wall, a base member, a stop on each of said end walls of said receptacle and extending outwardly therefrom laterally of the plane which is perpendicular to said end walls and which passes through the axis of rotation of said receptacle, to contact said base member upon the completion of the movement of said receptacle, detents on opposite ends of said receptacle, and release means mounted on said base member in cooperative relation to said detents for selectively arresting and permitting the swinging movement of said receptacle, whereby said articles may be conjointly inserted into, inverted in, and removed from said receptacle.

JOHN W. GIBLER.

REFERENCES CITED

The following references are of record in the file of this patent:

UNITED STATES PATENTS

| Number | Name | Date |
|---|---|---|
| 1,376,273 | Hansell | Apr. 26, 1921 |
| 1,829,089 | Hall | Oct. 27, 1931 |
| 2,187,065 | Wilson | Jan. 6, 1940 |
| 2,202,564 | Parker | May 28, 1940 |